H. O. SCHMIDT.
PROCESS OF MAKING GLASS PANELS FOR LAMP SHADES AND SIMILAR ARTICLES.
APPLICATION FILED JAN. 10, 1913.
1,123,016.
Patented Dec. 29, 1914.
3 SHEETS—SHEET 2.
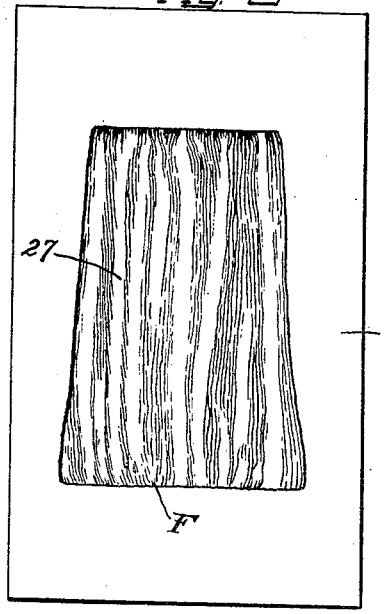
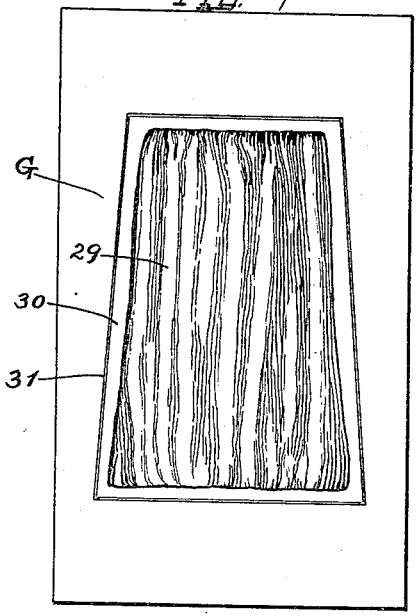
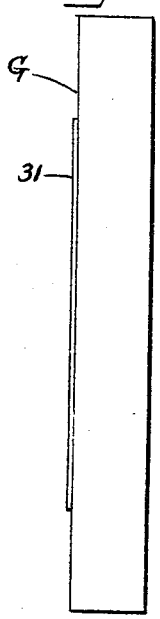
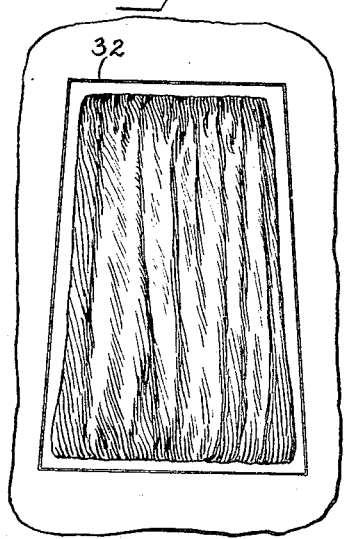
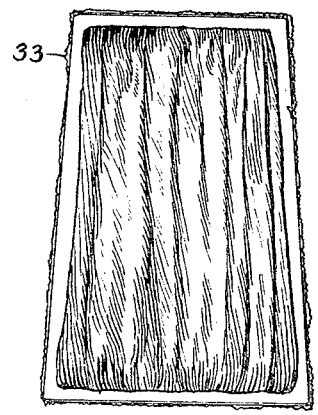
Witnesses
S H Clarke
R. W. Edwards
Inventor
Henry O. Schmidt
By Louis M. Schmidt
Atty.

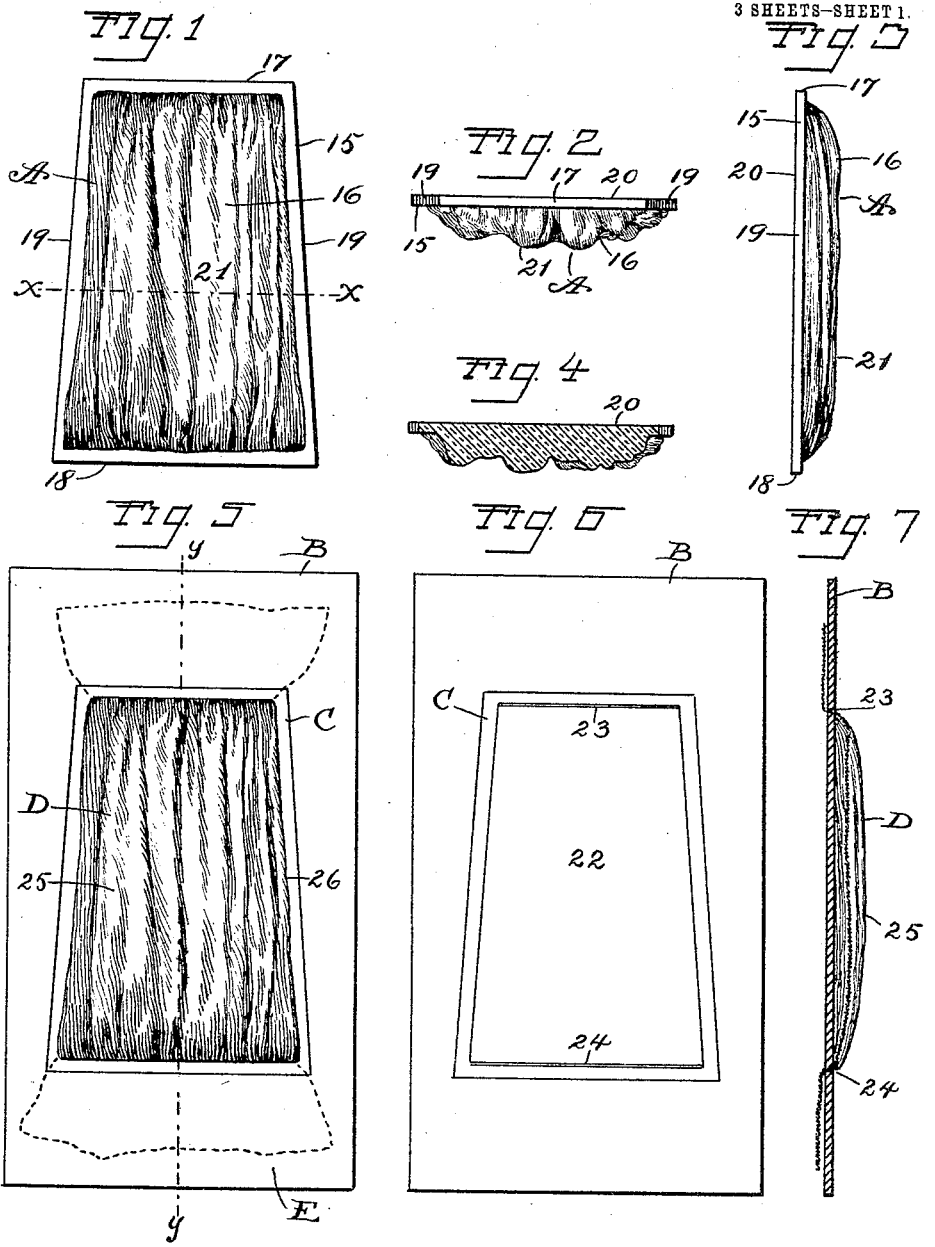

H. O. SCHMIDT.
PROCESS OF MAKING GLASS PANELS FOR LAMP SHADES AND SIMILAR ARTICLES.
APPLICATION FILED JAN. 10, 1913.
1,123,016.
Patented Dec. 29, 1914.
3 SHEETS—SHEET 3.
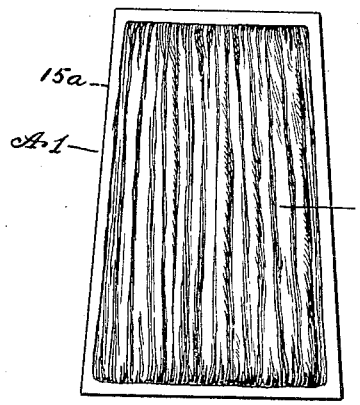
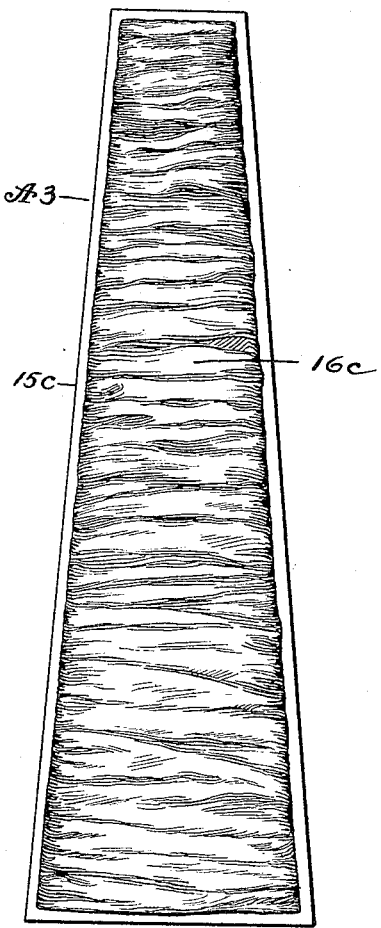
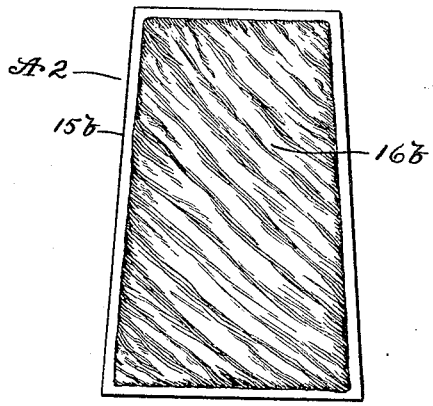
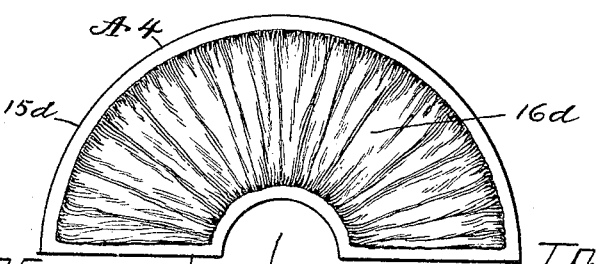
Witnesses
J. H. Clarke
R. W. Edwards
Inventor
Henry O. Schmidt
By Louis M. Schmidt
Atty.

UNITED STATES PATENT OFFICE.

HENRY O. SCHMIDT, OF NEW BRITAIN, CONNECTICUT.

PROCESS OF MAKING GLASS PANELS FOR LAMP-SHADES AND SIMILAR ARTICLES.

1,123,016.   Specification of Letters Patent.   Patented Dec. 29, 1914.

Application filed January 10, 1913. Serial No. 741,298.

*To all whom it may concern:*

Be it known that I, HENRY O. SCHMIDT, a citizen of the United States, residing at New Britain, in the county of Hartford and State of Connecticut, have invented certain new and useful Improvements in Processes of Making Glass Panels for Lamp-Shades and Similar Articles, of which the following is a specification.

My invention relates to improvements in processes of making glass panels for lamp shades and similar articles and one of the objects of my improvement is to produce a panel for lamp shades that will embody the characteristics of a panel made of fabric and that will be made of glass and by means that are simple and economical in operation.

In the accompanying drawing:—Figure 1 is a front elevation of my improved glass panel for a lamp shade. Fig. 2 is a plan view of the same. Fig. 3 is a side elevation of the same. Fig. 4 is a sectional view on the line $x\ x$ of Fig. 1. Fig. 5 is a front elevation of the model or form from which my glass panel is copied. Fig. 6 is a front elevation of the frame. Fig. 7 is a sectional view on the line $y\ y$ of Fig. 5. Fig. 8 is a front elevation of the plaster cast made from the form shown in Fig. 5. Fig. 9 is a similar view of a mold made from the cast shown in Fig. 8. Fig. 10 is a side elevation of the mold. Fig. 11 is a front elevation of a glass panel made on the mold shown in Fig. 9 and previous to breaking out the panel proper. Fig. 12 is a similar view of the same after breaking out the panel proper and previous to grinding off the edges to size. Figs. 13, 14, 15 and 16 show in front elevation modifications of my glass panel for a lamp shade.

My glass panel A for a lamp shade consists of a piece of glass having a proper outline to be set within a suitable frame work of metal and comprises a lateral border or rim 15 extending along the side and ends and a central body portion 16 inclosed by the said border or rim. As shown in Fig. 1 the form of the glass panel A is a trapezoid having the upper end 17 shorter than the lower end or base 18 the lateral edges 19 being divergent from the upper end 17 downward. The rim 15 is made a fit for the metal frame work holding means, so that in use the body portion 16 is exposed and uncovered. The rear face 20 of the panel A is plane, as shown in Fig. 4. The front face 21 of the body portion 16 is made to conform to the folds in a fabric, and particularly to the natural and actual folds of a fabric that is secured at two points or along two lines corresponding to two of the border lines of the body portion 16, and this condition may be effected in the following manner: A form frame B is provided and which consists of a piece of card board appreciably larger than the panel A. On the front face of the card board frame B is marked the outline C of the rim 15 in the form of a double line, inclosing a space 22 corresponding to the dimensions of the body portion 16. Then at two ends of the space 22 are provided slots respectively 23 at the upper end and 24 at the lower end and which in length correspond to the desired length or width of the body portion 16. The slots 23 and 24 may consist of simply a cut or slit or may consist of a slot formed by cutting out a small strip of the material of the form B and are suitable to receive and hold the ends of a piece of fabric D threaded therethrough and having the body portion 25 cover the space 22, as shown in Fig. 5. The walls of the slots 23 and 24 pinch the fabric D sufficiently to hold the same in any position in which the same may be set.

With the fabric D slidably held in the slots 23 and 24, the body portion 25 thereof may be adjusted to produce a natural and realistic arrangement of the folds and the lateral edges 26 may be trimmed to lay approximately along the lateral outline of the central space 22, and the same time avoiding any constrained mechanical effect, all as shown in the complete form E shown in Fig. 5.

From the production of the said form E, in the manner described, and shown in Fig. 5 to the production of the finished panel shown in Fig. 1 the steps that are followed are ordinary and comprise the following:— From the form E the plaster cast F is made, comprising as the body portion 27 the impression of the body portion 25 of the fabric D and a plane border 28 inclosing the same. From this a glass panel A may be produced directly or the same may be used to produce a mold or matrix G, which may be of metal. The said matrix G has a body portion 29 corresponding to the body portion 27 of the plaster cast F and a rim 30 corresponding to the rim 15 that is desired on the panel A. I prefer to have the rim 30 bordered by a ridge 31 to make an indentation or marking in the glass when in the plastic state as it is applied to the matrix G corresponding to the outer edge of the rim 15 and which is of course the outer edge of the panel A. As the glass is applied to the maxtrix G and extends over the lateral edges of the body portion 29 the ridge 31 makes an indentation 32 in the front face of the body of glass that facilitates breaking away the surplus glass along the lateral edges.

In Fig. 12 the panel A is shown after breaking out and having rough edges 33.

Fig. 12 represents the blank for the panel A in the rough. The stages in finishing the same may consist in grinding the edges 33 to the size desired and then finishing the front surface in any manner desired. The finish to the front surface that I prefer consists in sand blasting the said surface. In some cases acid treatment may also be used. An essential part of any finishing process that may be used is the removal of the surface glaze.

Whatever finishing treatment may be applied to the front surface, the back ground in all cases is the copy of the arrangement of the folds of the fabric D as described, and I find that when used in a lamp whether lighted or not, the effect of the body portion 16 is suggestive of the original fabric D from which the form and arrangement of the details were derived.

In the panel A shown in Fig. 1 the outer form is trapezoidal as mentioned, and is approximately rectangular, and the folds of the fabric D run longitudinally and slightly divergent.

In the panel $A^1$ shown in Fig. 13 the arrangement of the folds represented in the body portion $16^a$ is similar generally to the arrangement shown in panel A in Fig. 1 and differs therefrom in the arrangement of the details of the folds, the folds being in fact more uniform and less bulging. The rim $15^a$ corresponds essentially to the rim 15 shown in Fig. 1.

In the panels $A^2$ and $A^3$ shown in Figs. 14 and 15 the rims $15^b$ and $15^c$ are also trapezoidal but differ in dimensions from those of panels A and $A^1$ and in panel $A^2$ the body portion $16^b$ has the representations of the folds of the fabric extending diagonally and in the body portion $16^c$ of the panel $A^3$ they extend laterally or crosswise.

In Fig. 16 is shown a panel $A^4$ that is semi-circular in exterior outline and has a semi-circular recess 34 at the base 35 concentric therewith, the rim $15^d$ conforming to the outline described, and the body portion $16^d$ has the representation of the folds arranged radially.

Other changes in details may be made in the use of my invention according to the conditions that may exist in the particular styles of lamp shades desired.

It is obvious that other methods than the one described may be employed for the production of panels embodying the features of my invention. Also that the panels may be supported in a lamp shade in different ways from that shown and described. It is also obvious that my process as described can be used for making other articles than panels for lamp shades.

The process described operates satisfactorily and serves to produce a copy of the actual folds that are found in a piece of fabric and the process is the one that I prefer to use for the production of panels for lamp shades such as shown and described.

I claim as my invention:—

1. The process of making articles of glass consisting of making a matrix from a form of fabric, making the said articles from the said matrix, and removing the surface glaze from the exposed face of the said articles.

2. The process of making articles of glass consisting of making a matrix from a form of fabric, making the said articles from the said matrix, and finishing the exposed face of the said articles by sand blasting.

HENRY O. SCHMIDT.

Witnesses:
SHEFFIELD H. CLARKE,
ROGER EDWARDS.

Copies of this patent may be obtained for five cents each, by addressing the "Commissioner of Patents, Washington, D. C."